United States Patent [19]

French

[11] Patent Number: 4,543,066

[45] Date of Patent: Sep. 24, 1985

[54] DIGITAL TRANSMITTER SIMULATOR

[75] Inventor: Donald M. French, San Diego, Calif.

[73] Assignee: The United States of America as represented by the Secretary of the Navy, Washington, D.C.

[21] Appl. No.: 595,213

[22] Filed: Mar. 30, 1984

[51] Int. Cl.[4] ............................ G09B 9/00; H04L 7/04
[52] U.S. Cl. .................................... 434/242; 434/219; 375/10
[58] Field of Search ...................... 375/10, 42, 45, 46, 375/62, 67; 434/219, 242

[56] References Cited

U.S. PATENT DOCUMENTS

| | | | |
|---|---|---|---|
| 3,004,350 | 10/1961 | Marret et al. | 35/10.2 |
| 3,743,754 | 7/1973 | Elsenberg | 35/10.2 |
| 3,982,244 | 9/1976 | Ward | 343/16 M |
| 3,987,374 | 10/1976 | Jones, Jr. | 375/42 |
| 4,134,217 | 1/1979 | Neilson | 35/10.2 |
| 4,167,821 | 9/1979 | Gibson, Jr. | 35/10 |
| 4,258,436 | 3/1981 | Campbell | 375/10 |
| 4,290,140 | 9/1981 | Malm | 375/46 |
| 4,311,466 | 1/1982 | Carpenter | 434/242 |

Primary Examiner—Richard C. Pinkham
Assistant Examiner—Vincent A. Mosconi
Attorney, Agent, or Firm—Robert F. Beers; Ervin F. Johnston; Thomas Glen Keough

[57] ABSTRACT

A modulated VLF signal source has the capability for providing radio signals suitable for performance testing and operator training relative to VLF digital data receiving systems. A number of separately proven components are utilized to implement a relatively low cost, reliable compact and easily transportable system. A digital modulator is driven through suitably adapted microprocessor circuits by selective information stored on floppy diskettes. Operator input commands actuate the modulator to generate representations of data in the continuous shift keying, frequency shift keying, or minimum shift keying output modes to provide a modulated VLF output which can be received by several receive systems. Prolonged data transmissions can be produced by merely selecting the appropriate floppy diskettes to initiate the desired modulated sequences.

6 Claims, 13 Drawing Figures

DIGITAL TRANSMITTER SIMULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The field of the invention pertains to apparatuses and methods for generating VLF radio signals for data transmission. In more particularity, the invention resides in the field of digital techniques for data transmission having the purposes of (1) providing suitable signals for conducting performance tests of VLF digital data receive systems and, (2) providing suitable transmission sequences for training VLF receive system operators. In still greater particularity, the field of the invention concerns a digital record/reproduce system utilizing a built in digital modulator which provides all commonly used forms of VLF signal modulation during playback.

VLF radio signals having appropriate digital data trains and proper modulation are required for testing and training purposes relative to VLF receive systems. Previously, a colocated military VLF transmitter system has been used to provide the test or training signals. This test or training configuration ties up expensive military VLF transmitter equipment which is in short supply. Thus, there is a current need in the state of the art for a reliable, low cost, effective system for providing modulated VLF radio signals for test and training operations which has the capability for varying the modulation and the information content of the transmitted information while being compact and easily transportable to VLF testing facilities or training sites. Since the present invention provides such a system, a great savings in cost can be achieved.

SUMMARY OF THE INVENTION

The present invention is directed to providing a digital record and playback system which is capable of generating very low frequency shift key modulated radio signals. The device has the capability for supplying digital data to a built in modulator at different baud rates for the purpose of generating continuous shift keying, frequency shift keying, or minimum shift keying VLF output signals from digital data stored on floppy disketts. Microprocessors continuously feed updated data from the disketts to RAM memory and subsequently to the digital modulator which provides the modulated VLF radio output signal for driving several VLF receiver systems.

A prime object of the invention is to provide a modulated VLF signal for test and training purposes.

Still another object of the invention is to provide a modulated VLF signal source having the capability for generating continuous shift keying, frequency shift keying, or minimum shift keying output signals.

Still another object of the invention is to provide a VLF signal source having the capability for transmitting digitally modulated signals originating from floppy disk drives to provide more flexibility and capability for testing and training purposes.

Yet another object of the invention is to provide a modulated VLF signal source employing a number of proven digital components thereby improving reliability and reducing costs.

Yet another object is to provide a VLF signal source of compact size and of high reliability which is easy to maintain and does not require elaborate alignment procedures normally attendant conventional VLF transmitter systems.

These and other objects of the invention will become more readily apparent from the ensuing specification and claims when taken with the appended drawings.

DESCRIPTION OF THE PREFERRED EMBODIMENT

Figure 1:
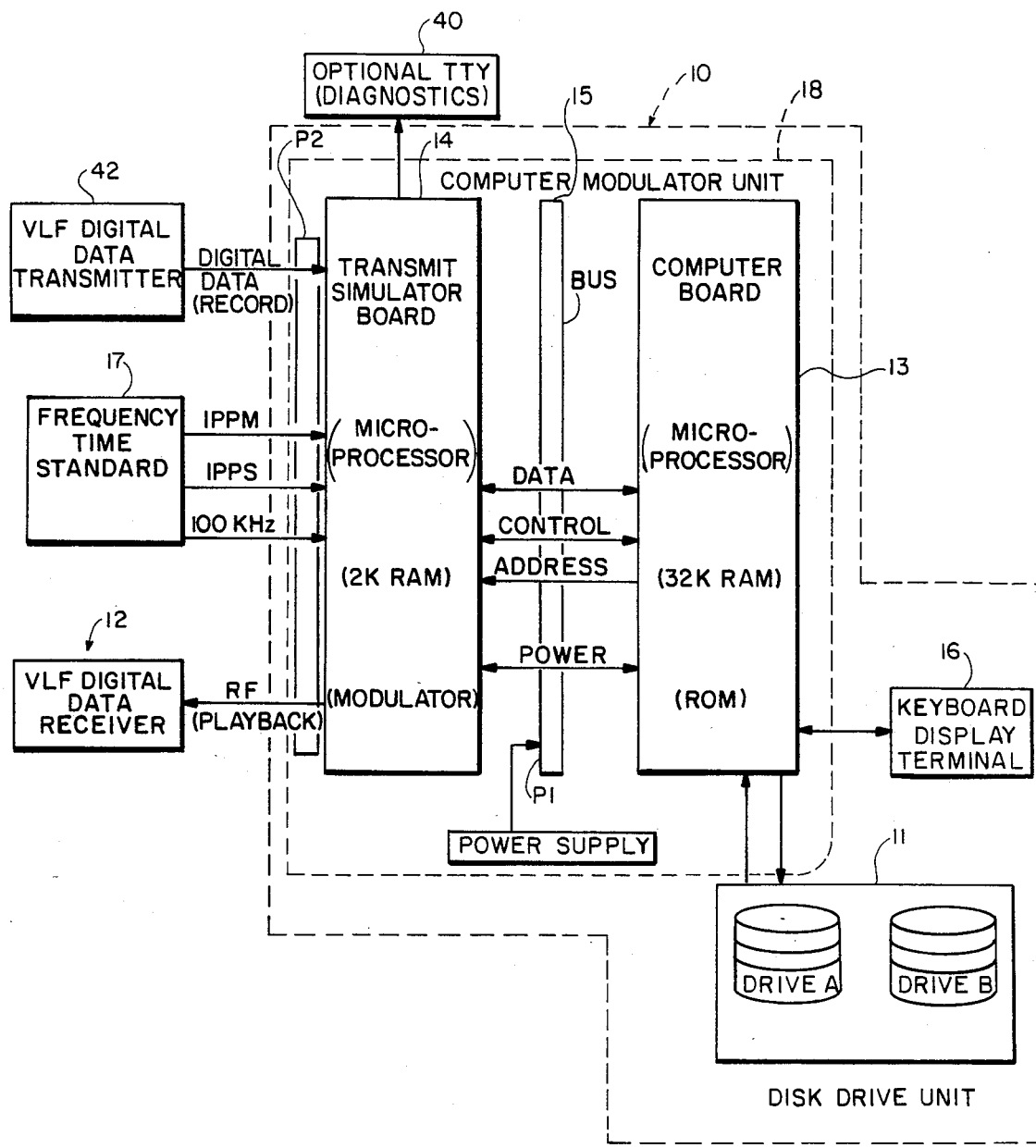
FIG. 1 is a block diagram representation of the system operatively associated with peripheral equipment for assuring properly modulated VLF signal generation.

Referring to FIG. 1 of the drawings, a digital transmitter simulator 10 is disposed operationally to provide VLF signals modulated in accordance with a predetermined mode of modulation. This predetermined mode of modulation is either the continuous shift keying, the frequency shift keying, or the minimum shift keying mode providing the required VLF output signal from stored digital data which originates in a disk drive unit 11. A typical disk drive unit that performed satisfactorily is one marketed by Shugart, Inc. as the model SA 851 Floppy Disk Drive. The unit is mounted in a commercially available enclosure, a model 8001-2 by Axis Corp. and has its own power supply and cooling fan.

These modulated VLF output signals are utilized to perform performance testing and training functions on one or more receivers 12 coupled to the digital transmitter simulator via coax cable. The receivers can be operationally disposed in a communications network test bed, or could be clustered in a training facility for a number of trainees.

In addition to other elements and components to be elaborated on below, the computer modulator Unit 18 contains two plug-in circuit boards; computer board 13 and transmit simulator board 14 operatively coupled one to the other by a bus 15. Conveniently enough, computer board 13 (a translating means) and transmit simulator board 14 having a data transition circuit are each housed in a common card cage with bus 15 assuming the physical configuration of a printed circuit backplane. Additionally, the computer modulator unit contains cooling fans and a power supply which furnishes DC voltages to bus 15.

A typical cabinet enclosure which contains a suitable power supply, card cage with a backplane, and cooling fans would be an SBC 655 system chassis marketed by Intel Corp.

A keyboard display terminal 16 is operatively coupled to the digital transmit simulator through computer board 13. A model TM76 microterminal marketed by Burr Brown Inc. was selected to initiate the proper commands and to provide a responsive display. An operator's control of the system is initiated via the keyboard display terminal which displays operator prompts on the 12 character alphanumeric display and inputs operator responses from the 29 character keyboard. In addition, the keyboard display terminal provides a real-time clock output, following the start-up of the digital transmitter simulator and may be used in the playback mode to obtain the receiving system's start-up time. Full details on the capabilities of the keyboard display terminal may be gleaned by consulting the model TM76 user's guide and further elaboration at this point is felt unnecessary. The radio output center frequency was chosen to be at 22.1 kHz due to a requirement for interfacing with various VLF receiver test bed facilities. The keying pattern and therefore the information content is determined by the digital information signals coming from the disk drive unit 11. The rate at which the digital data is presented to the modulator keying circuits and subsequently transmitted is selectable at 50, 100, 200, 800 or 1600 baud per second where one baud equals one digital data bit. The VLF output signal delay is selectable in one millisecond steps from zero milliseconds to 80 milliseconds. The floppy diskettes in the disk drive units have a storage capacity of approximately 500 million bytes. With automatic switching between disk drive units and operator insertion of replacement diskettes, the duration of the playback time can be made to extend indefinitely. All of the electronics and electromechanical devices forming a part of the digital transmitter simulator require 110 volts, 60 hertz and collectively consume not more than 300 watts of power applied in liveable temperatures and humidities.

The major system components and signal paths internal and external to the system are schematically set forth in FIG. 1 and, in this regard all operations within the system are controlled by the computer board 13 and the transmit simulator board 14. The computer board is a Zilog Z80a microprocessor based computer board marketed by Monolithic Systems Inc. as a model MSC 8009. This commercially available computer board provides interfaces for the digital disk drive unit 11, the internal interface bus 15, and the keyboard display terminal 16. In accordance with the operation described in detail in the users manual for the MSC 8009, the single board computer boots in the operating program (the main program module) from the disk drive A in disk drive unit 11. Additionally, operator prompts are relayed to keyboard display terminal 16 to provide a visual indication of what has transpired and the actuation sequences to be followed for further initiation of a VLF transmitter simulation. Computer board 13 further transfers data signals representative of the desired modulation type and baud rate to mode register 21 of the transmit simulator board as well as initializing and providing for the start time, stop time, and RF output delay in response to the operator control signals at keyboard display terminal 16. The loading of the first block of transmit data and the microprocessor operating program into the 2K static RAM 20 on the transmit simulator board permits the initial transmission of data in the playback mode to receiver 12.

The initialization and starting of the transmit simulator board at the operator selected start time is performed by the single board computer 13 which also sends a visual indication of relative system time in hours, minutes and seconds for the keyboard display terminal on every second following start-up of the digital transmitter simulator. The computer board periodically reloads or empties the RAM data buffers on the transmit simulator board 14 following the start-up of the digital transmitter simulator in the playback or record modes, respectively. The coupling between the computer board 13, the transmit simulator board 14 and the power supply is accomplished via a bus 15 which has been selected as an Intel Multibus that constitutes the printed circuit backplane of the SBC655 card cage. This bus-backplane provides bidirectional address, data and control lines as well as power lines and an eight mHz clock line. Other bus-backplane and accompanying card size arrangements could have been selected, however the INTEL MULTIBUS was selected because it accommodates a large card size and provides the housing and interface for the selected commercial computer board 13.

Figure 2:
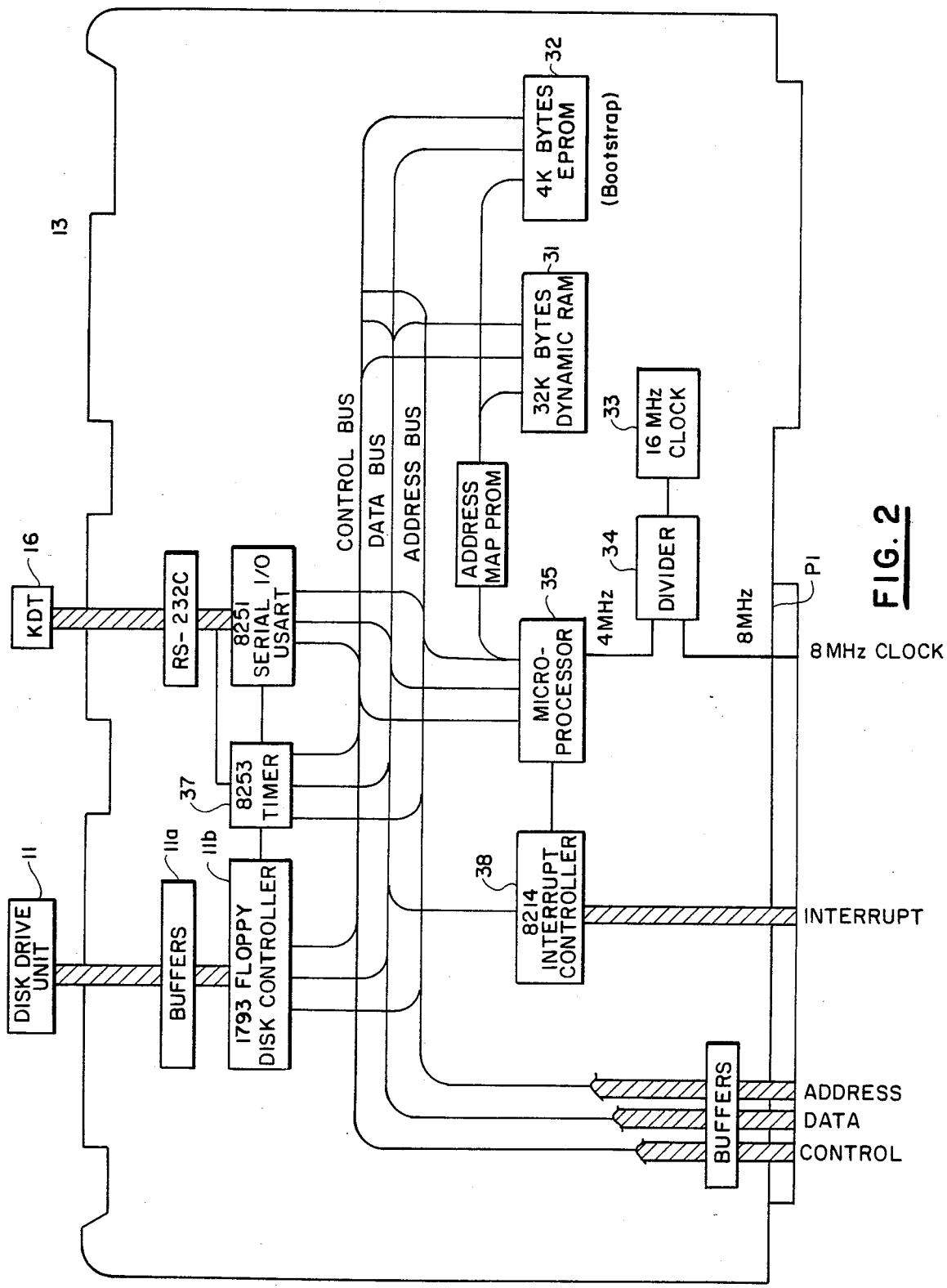
FIG. 2 is a block diagram of the computer board depicted in FIG. 1 showing the principal constituents thereof.

As mentioned before the computer board is a commercially available single board computer marketed as an MSC 8009. The major integrated circuits on the board are shown in FIG. 2 and follow conventional well established design expediencies to interface with each other and to the bus via the tri-state address, data and control signal lines.

A dynamic RAM 31 provides 32 kilobites of onboard memory while an EPROM 32 allows for the boot strap loader function.

Internally computer board 13 contains a 16 mHz clock 33 having a divider circuit 34 for delivering two clock frequencies, a 4 mHz clock signal for Z80A microprocessor 35 operation and an 8 mHz clock for output to the transmit simulator board 14 via bus 15. Floppy disk controller 11b, an integrated circuit type 1793, is the major component providing the floppy disk control function to disk drive 11. This allows a bidirectional transfer of command signals and data transfer between the single board computer and drive A and drive B within the disk drive unit. An interface to the keyboard display terminal is made through an integrated circuit designated 8251 and line buffers designated RS-232C to assure the proper coupling of this unit. A further function of the single board computer is the periodic reading of data files from the diskette in the disk drive unit to the RAM 31 when in the playback mode or vice versa in the record mode. A timer 37 is formed of an IC8253 and functions to provide timing signals which operatively couple the keyboard display terminal 16 and the disk drive unit 11 to the computer board 13. An interrupt controller 38 is included for interrupt control vectoring and is formed from an IC8214.

Details of the functions outlined above are available in the manuals and documentation on the MSC8009 available from Monolithic Systems Corporation.

Figure 3:
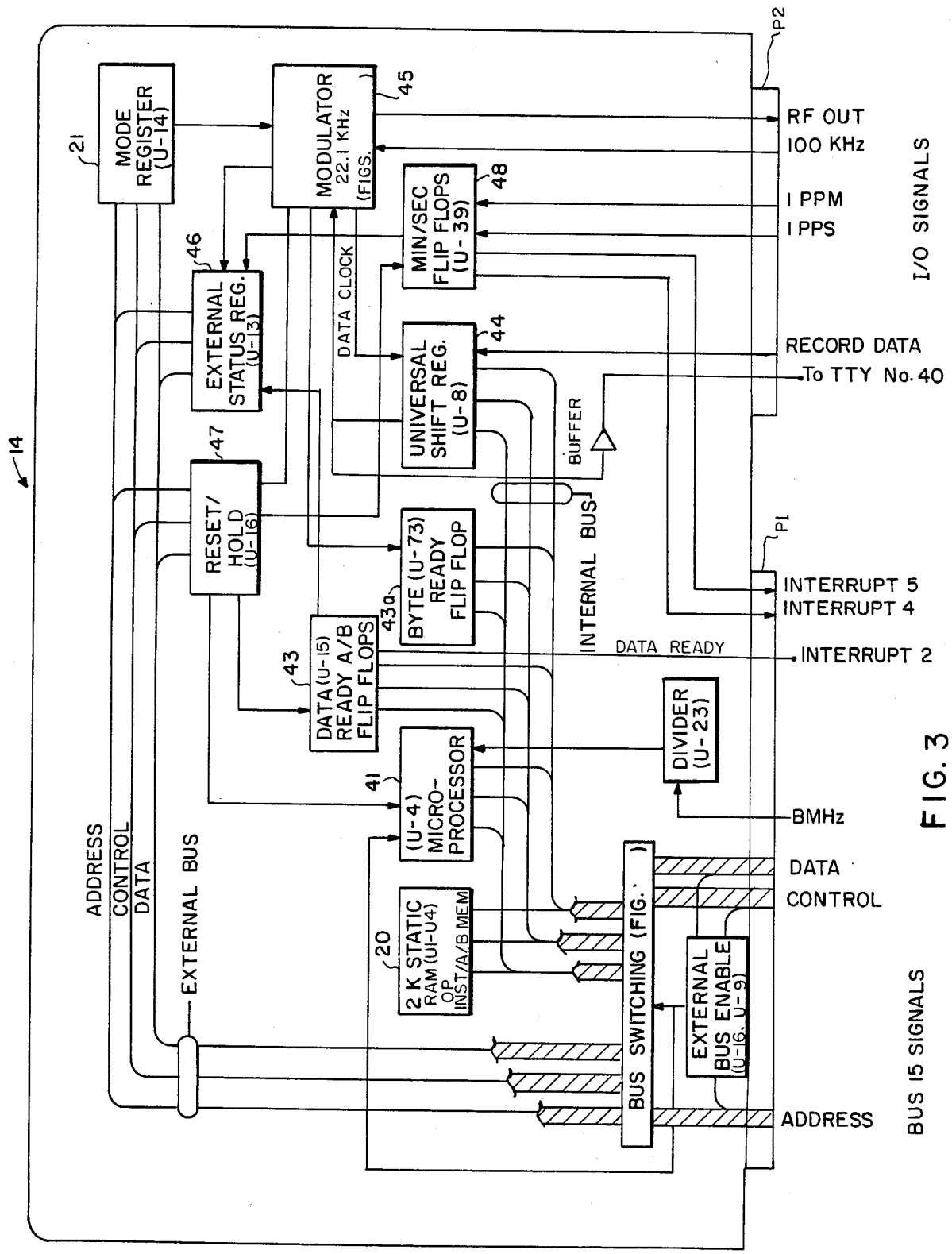
FIG. 3 is a block diagram of the transmit simulator board which provides a modulated VLF output signal for test and training purposes.
Figure 4:
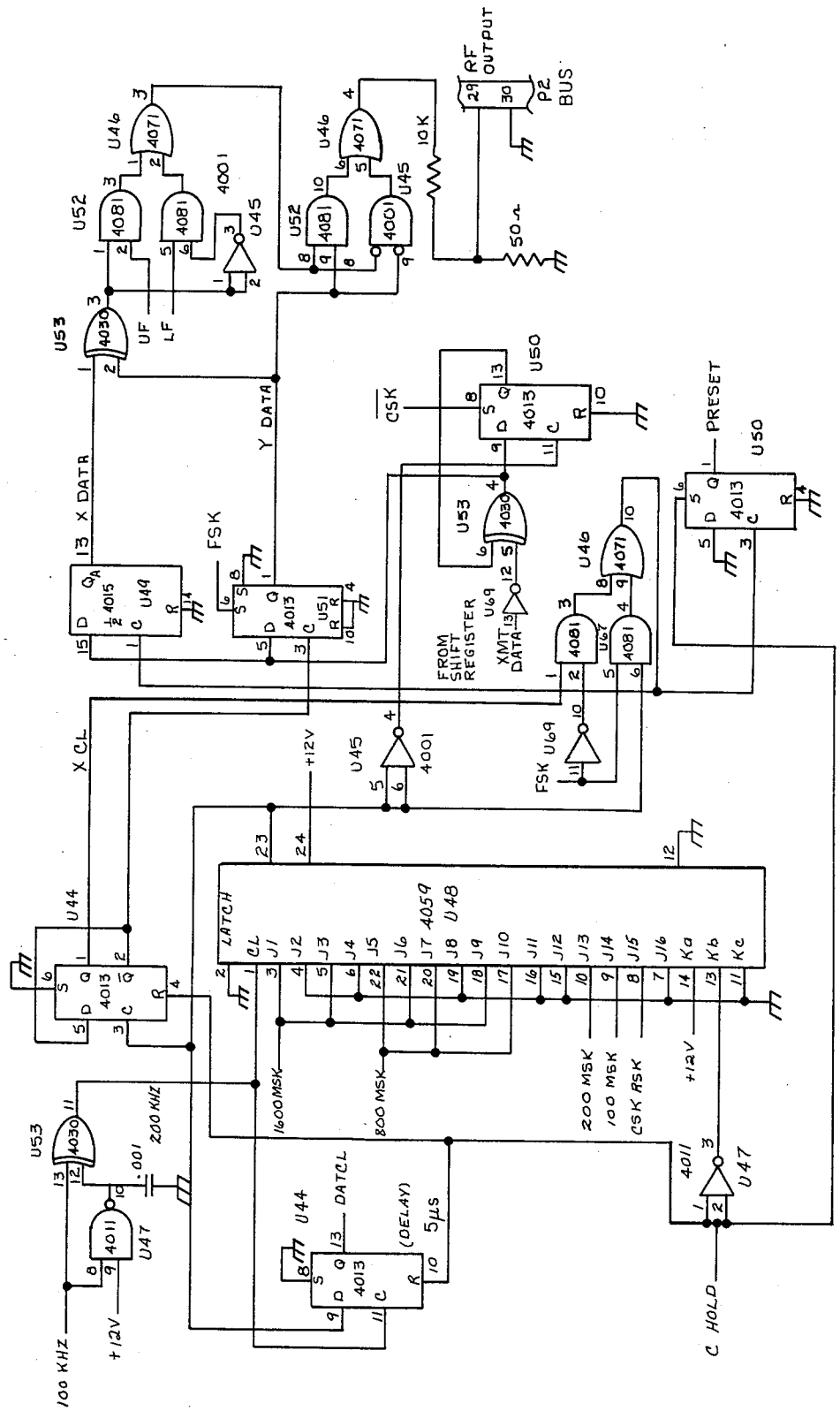
FIGS. 4–11 show in greater detail the circuit elements of the transmit simulator board of FIG. 3 as well as the operative association with other elements of this system.
Figure 5:
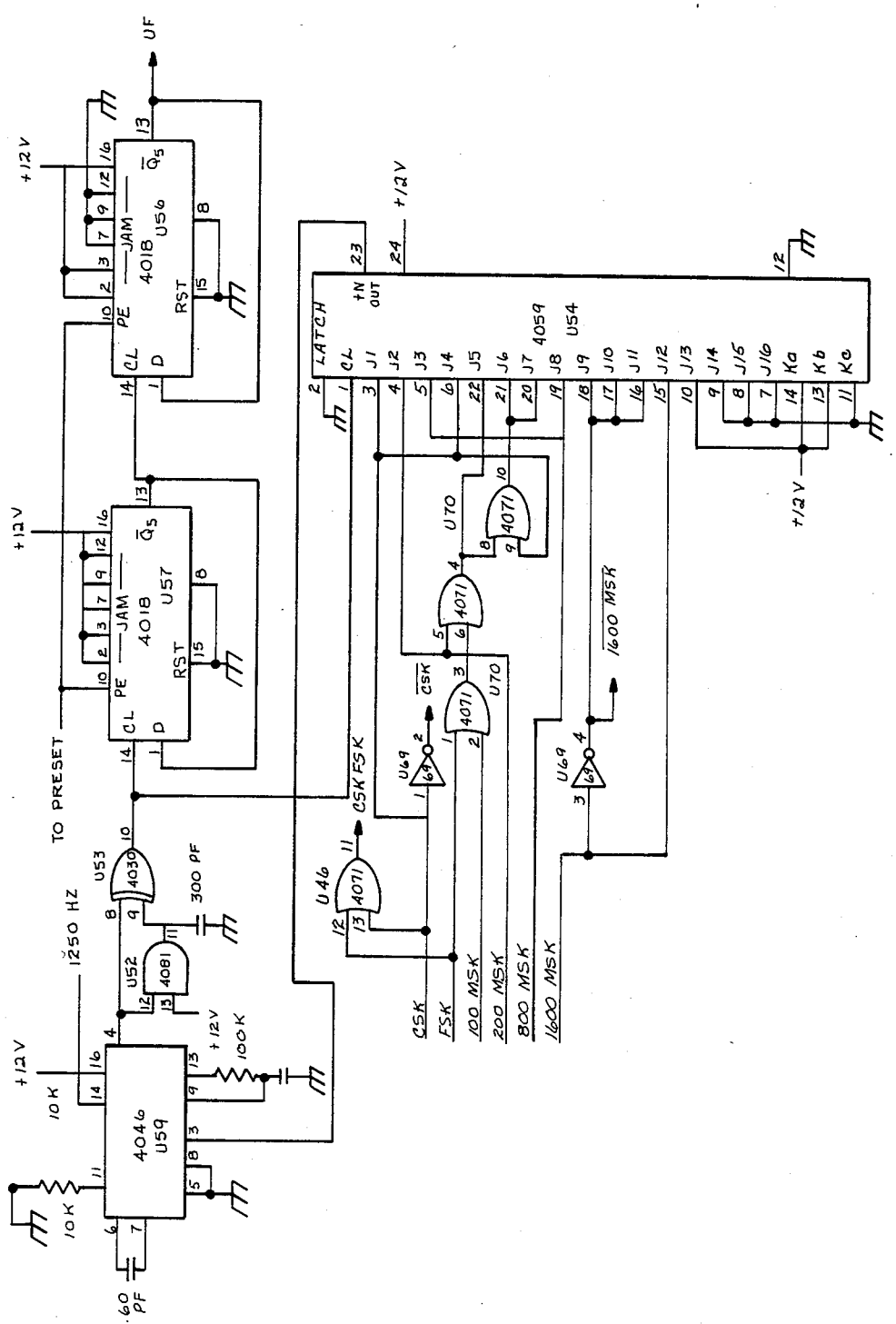
Figure 6:
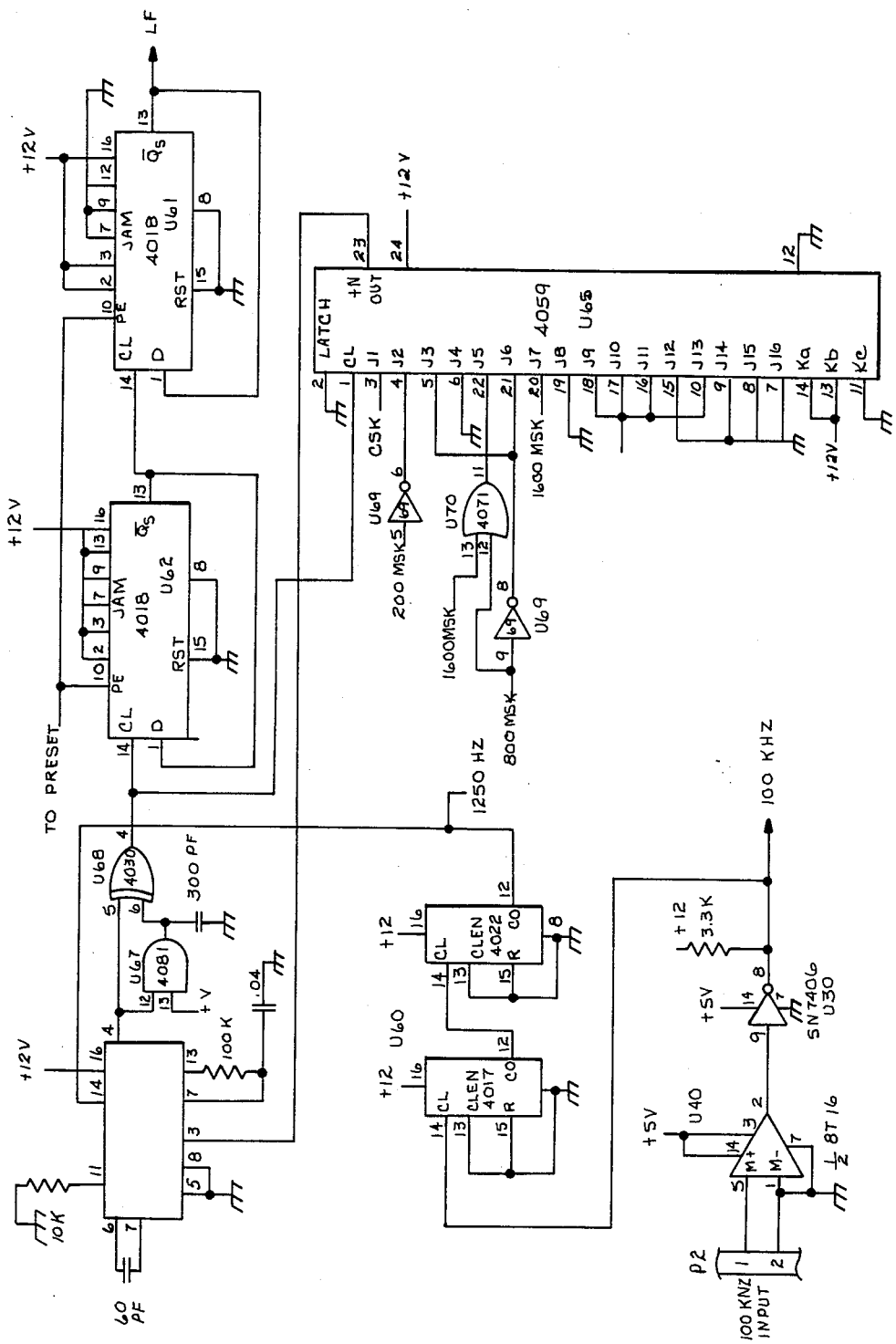

Referring now to FIG. 3, interconnections of transmit simulator board 14 including the input output signals between the computer board 13 as well as the other equipment are shown in greater detail. In this regard, the bus 15 connector P1 includes all those connections between transmit simulator board 14 and computer board 13 among them being the address, control, data, interrupt, and the 8 mHz lines. The other connections to the transmit simulator board are the 22.1 KHz RF output to receiver 12, the one pulse per minute, one pulse per second and 100 kHz signal inputs from frequency time standard 17, the output to optional teletype 40, and the record data input from transmitter 42 all of which are routed via connector P2. Optional teletype 40 is used to print the unmodulated digital data coming from the output of shift register 44 in the playback mode which is useful for diagnostic purposes.

The transmit simulator board performs a variety of tasks including the buffer storage of digital data received from transmitter 42 which is periodically forwarded to the RAM 31 on computer board 13 and then recorded onto the diskette in the disk drive unit when operated in the record mode. Another function is the buffer storage of data transferred from the computer board 13 and the periodic transfer of the data to universal shift register 44 for output to modulator 45 when operated in the playback mode. A further function of the transmit simulator board is the modulation of the output carrier frequencies by the data thus transferred to provide a CSK, FSK or MSK modulated VLF output signal for receiver 12. Additional functions of the transmit simulator board are to furnish real time clock signals to the computer board via external interrupt lines 4 and 5 of P1 and to notify the computer board that the data buffer portion of RAM is ready for data transfer via interrupt line 2.

Figure 12:
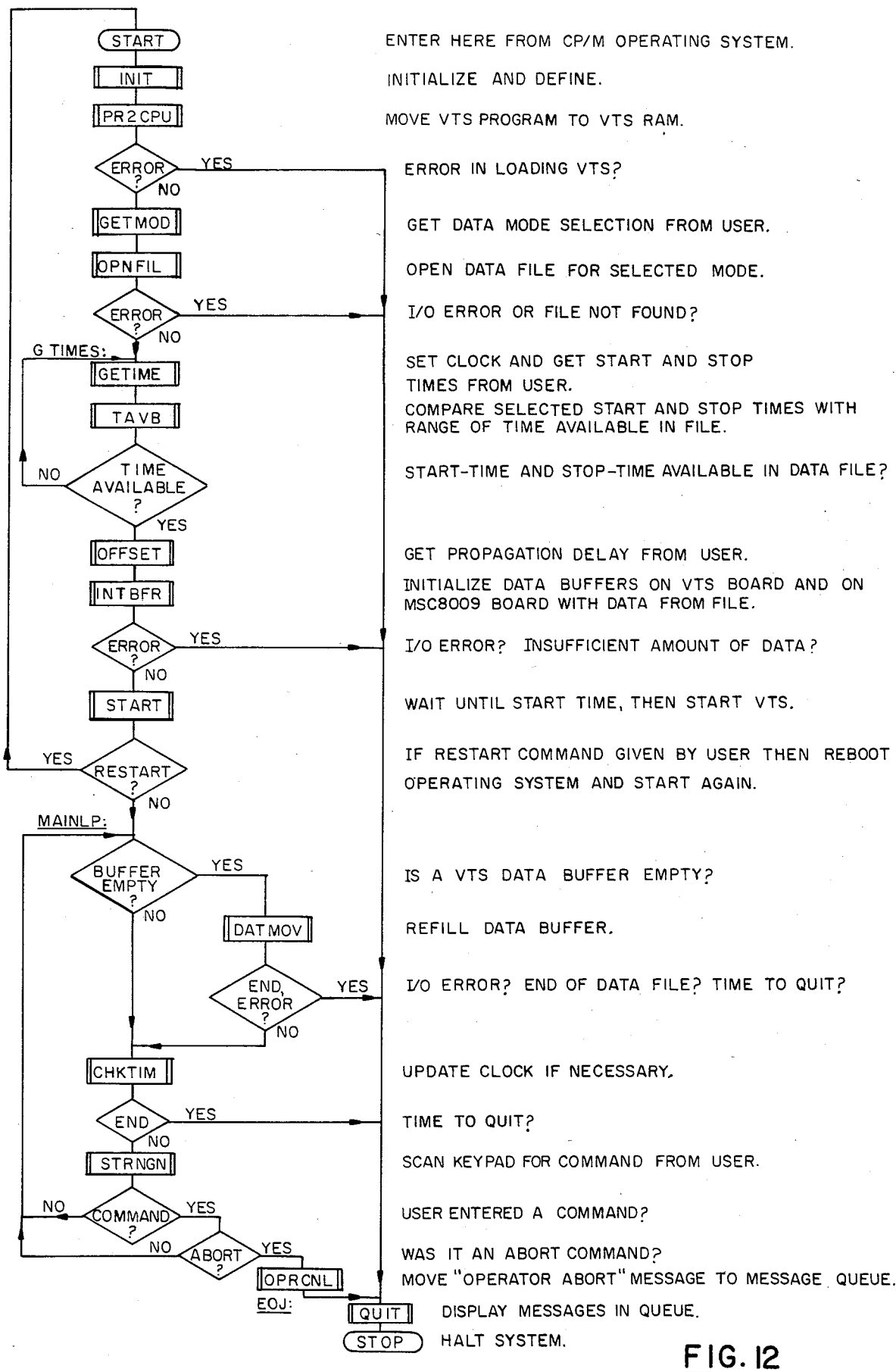
FIGS. 12 and 13 are flowcharts showing the executive program for recording digital data from a transmitter and for playing back the data through the modulator thereby providing a VLF RF output signal.
Figure 13:
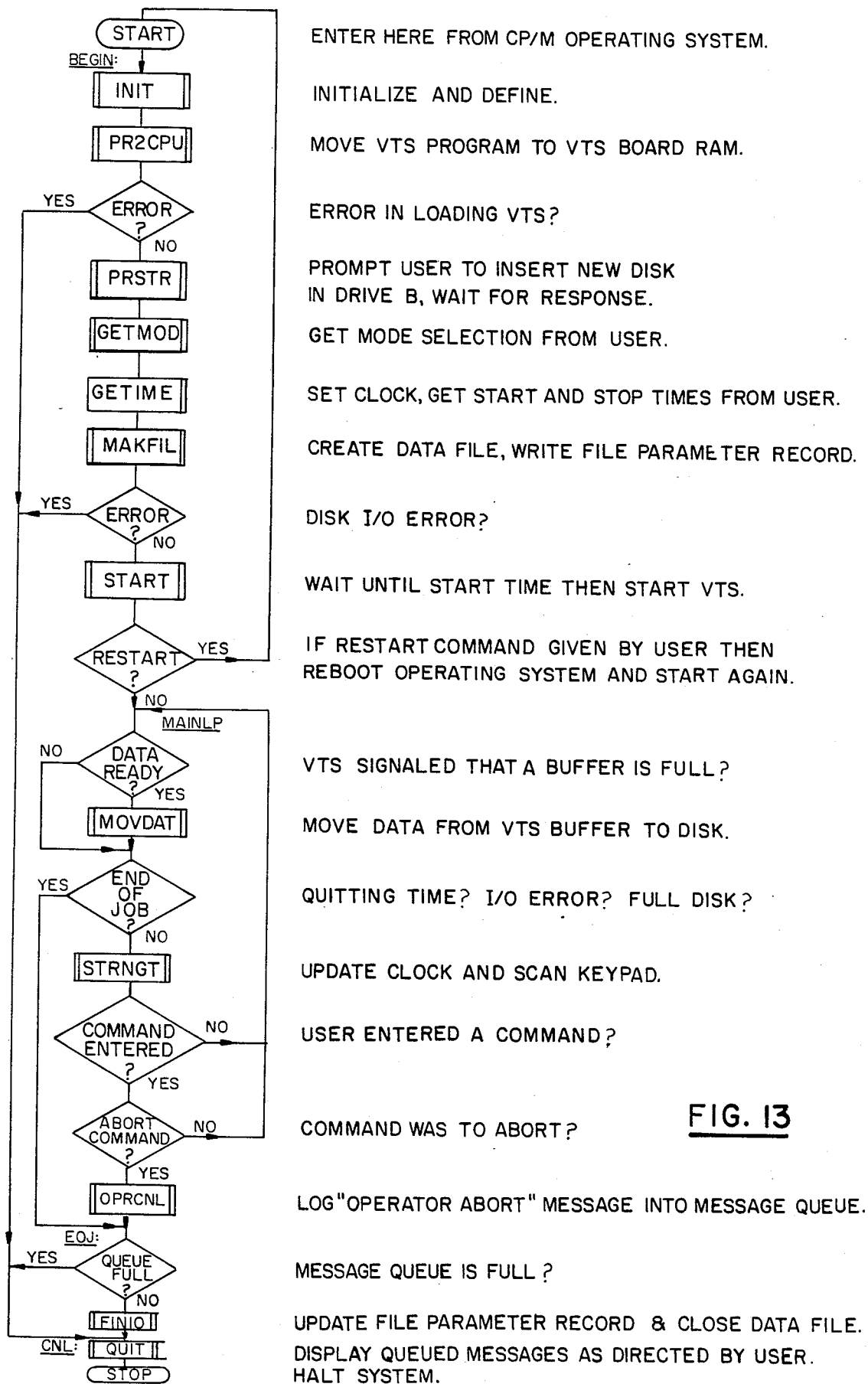

Digital data representing the microprocessor operating programs as well as the information to be transmitted are transferred from floppy diskettes in the disk drive unit to the computer board 13. Flow charts of typical executive programs for playback and record functions are shown in FIGS. 12 and 13.

Noting FIG. 3, an external bus associated with the transmit simulator board is normally enabled allowing the computer board 13 to communicate with selected circuits of the transmit simulator board 14 without interference with the circuits attached to the internal bus on the same board. Internal operations on the transmit simulator board are controlled by the microprocessor 41 which communicates with a 2K static RAM 20, a data ready A/B flip-flop 43, a byte ready flip-flop 43a and a universal shift register 44 via a board internal bus.

The operating program for the microprocessor 41 is loaded into the lower portion of 2k static RAM 20 by single board computer 13 and the remainder of the RAM is reserved for data buffering. The program divides the RAM data into two equal data parts which are referred herein as the A and B data buffers within the RAM and have a content of 256 bytes each.

Universal shift register 44 functions as a serial input-parallel output shift register in the record mode and as a parallel input-serial output shift register in the playback mode. Modulator 45 provides a data clock on an output line coupled to the shift register for shifting data into or out of the shift register during the record or playback modes respectively. The serial output from the shift register is connected to the modulator data input and to the teletype output buffer.

The byte ready flip-flop 43a is set by a signal from the modulator which occurs periodically when eight bits (one byte) have been shifted into or out of the shift register 44. Microprocessor 41 polls the byte ready flip-flop 43a and determines when to load or unload the shift register 44 and transfer the data byte to or from either the A or B data buffer in the 2k static RAM 20.

After completion of the data transfer, microprocessor 41 resets byte ready flip-flop 43a.

When the microprocessor 41 has completed unloading or loading the A or B data buffer in the 2k static RAM, it sets the corresponding A or B data ready flip-flop 43 the outputs of which are connected to external status register 46. This also causes an interrupt signal to be sent to the computer board 13. External status register 46 is then read by the computer board 13 to determine the status of the A and B data buffers and also the proper time windows for writing or reading to the A to B data buffer without interfering with internal bus operations. At the appropriate time the computer board 13 sends a signal to reset hold circuit 47 that places microprocessor 41 on hold after which data is either written to or read from the A or B data buffer in RAM 20. The communication by computer board 13 with external status register 46 and the hold position of 47 via bus 15 is without disruption of any internal operations of the transmit simulator board 14.

Figure 9:
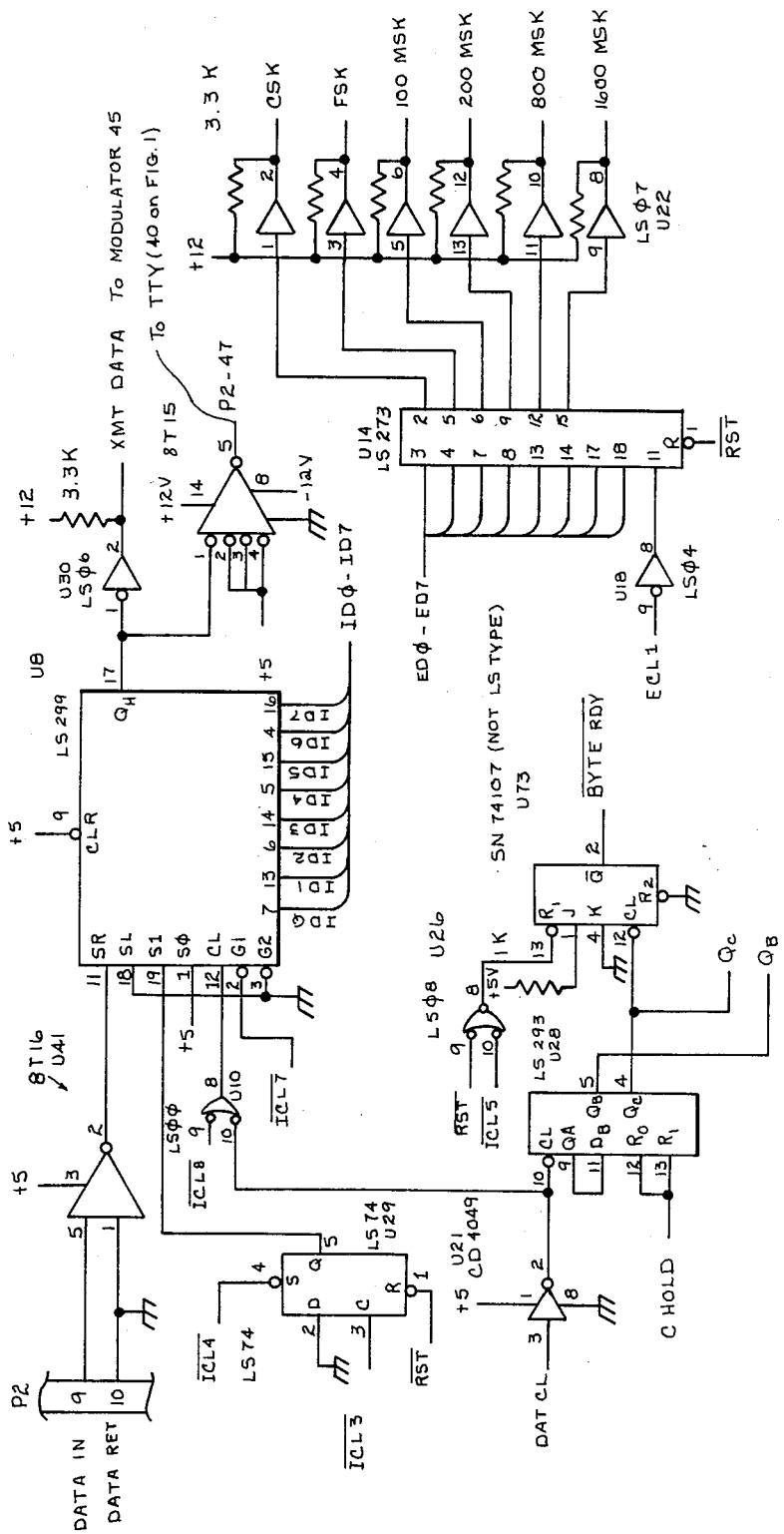

Mode register 21 shown as U14 in FIG. 9 is used by the computer board 13 to initiate modulator 45 to function in one of six operating modes; the 50 baud continuous shift keying mode, the 50 baud frequency shift keying mode, the 100 baud minimum shift keying mode, the 200 baud minimum shift keying mode, the 800 baud minimum shift keying mode and the 1600 baud minimum shift keying mode. Details of the modulator are set forth in appendix A.

The reset/hold circuit 47 allows the computer board 13 to start microprocessor 41 and modulator 45 at a predetermined minute mark during system start-up. The data ready A/B flip-flops 43 and the minute/second flip-flops 48 are periodically reset by the computer board following the start-up. The minute and second flip-flops 48 are set by one pulse per minute and one pulse per second signals respectively which are sent from the frequency time standard 17 as indicated. When one of these flip-flops within circuit 48 is set, it causes an interrupt signal 4 or 5 to be transferred to interrupt controller 38 in computer board 13 via multi-bus 15.

A brief description of playback operations is provided below for added insight. A diskette is inserted in drive A having the appropriate playback program which includes the sequence of data to be transmitted. Disk playback software is loaded into the 32K RAM on computer board 13 from the floppy diskette by merely pressing a reset switch on the front of the SBC 655. This task operationally is effected by the bootstrap program which is permanently resident in EPROM 32. The information that gets loaded into the 32k RAM contains the operating program for the computer board 13 as well as the operating program for the transmit simulator board 14. The computer program to operate microprocessor 41 on transmit simulator board 14 gets transferred from computer board 13 during the start-up procedure. Also, during the start-up procedure the computer board 13 transfers the initial block A and block B data over to transmit simulator board 14 so that it will have data to transfer into modulator 45 upon start-up. The data file for each mode gives an indication of the start time and the ending time of that file. Playback startup procedures call for the operator to enter a certain start time via the keyboard display terminal. After which the computer board 13 runs an algorithm to determine where the first byte of data to be transmitted is located and consequently where to start transferring blocks of data out of the file over to the A and B memories in static RAM 20 on transmit simulator board 14. During start up, the operator enters a desired time of day for the transmit simulator real time clock. Following this the realtime clock is updated by the one pulse per minute and one pulse per second signals from the frequency time standard 17. Following start up, the clock time is continually displayed at the keyboard display terminal. Any transmit start time can be selected that is within the range of available times identified on the diskette label and when the realtime clock reaches the time selected, the transmit simulator automatically starts the transmit output sequences.

Figure 7:
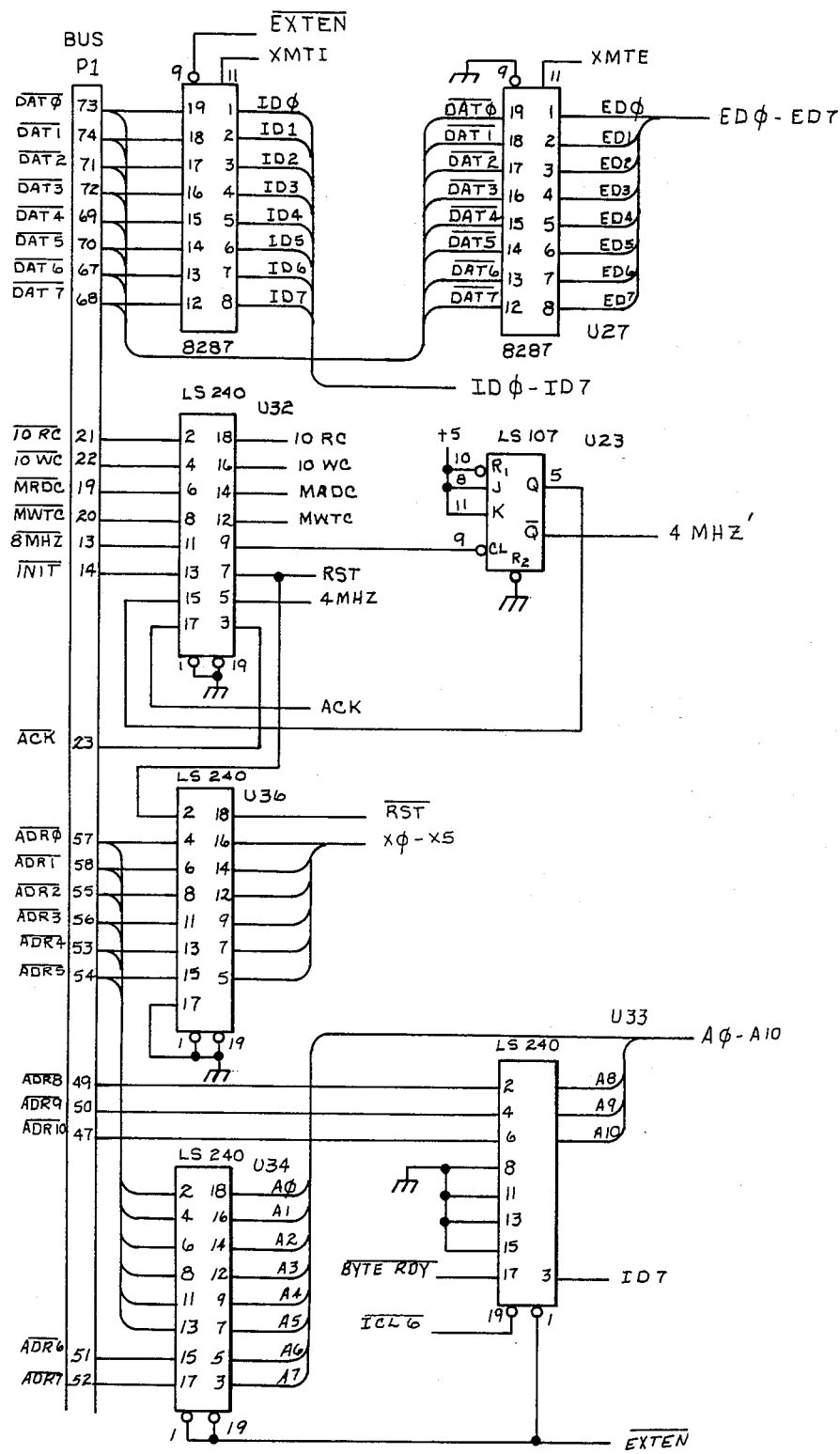
Figure 8:
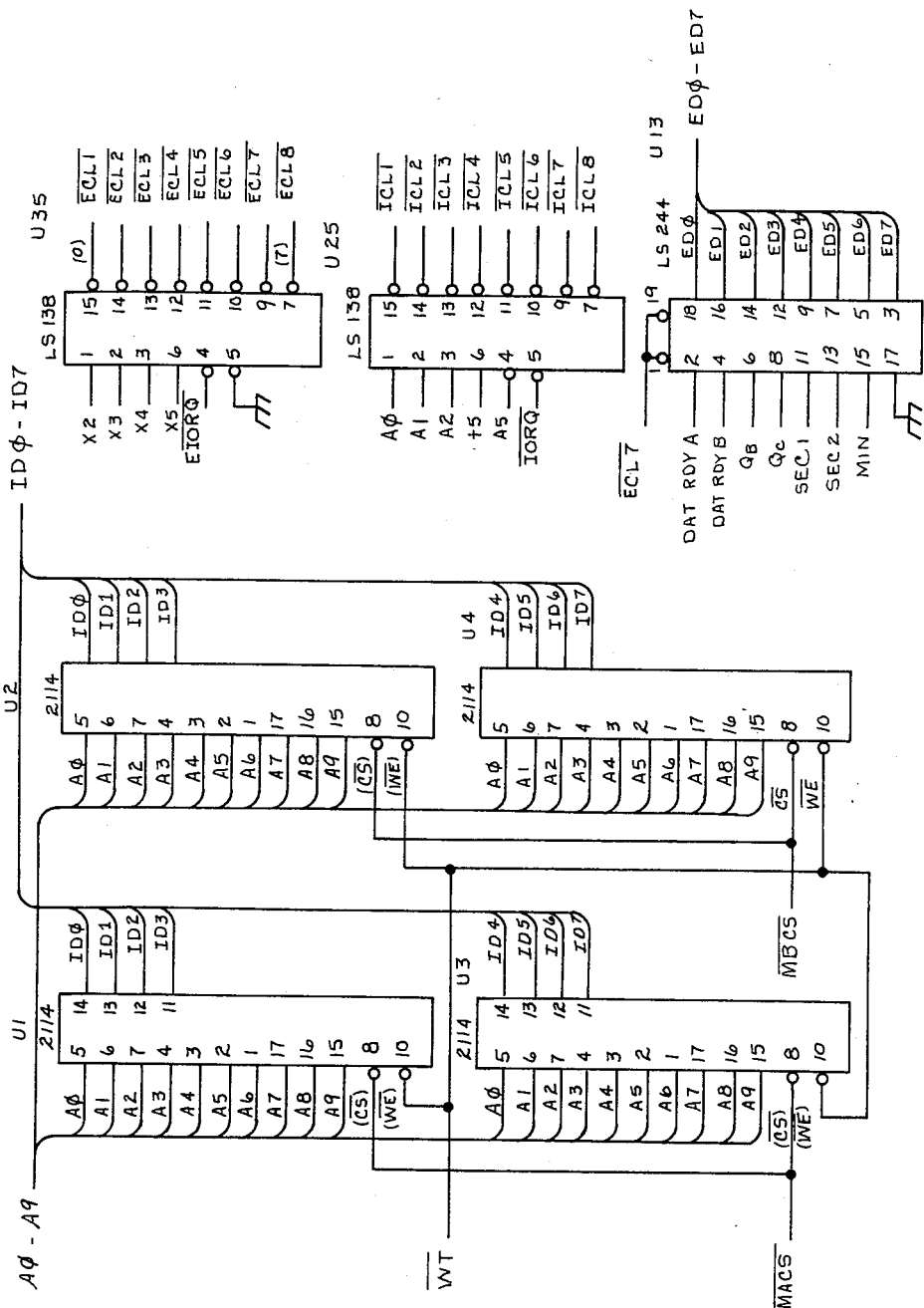
Figure 10:
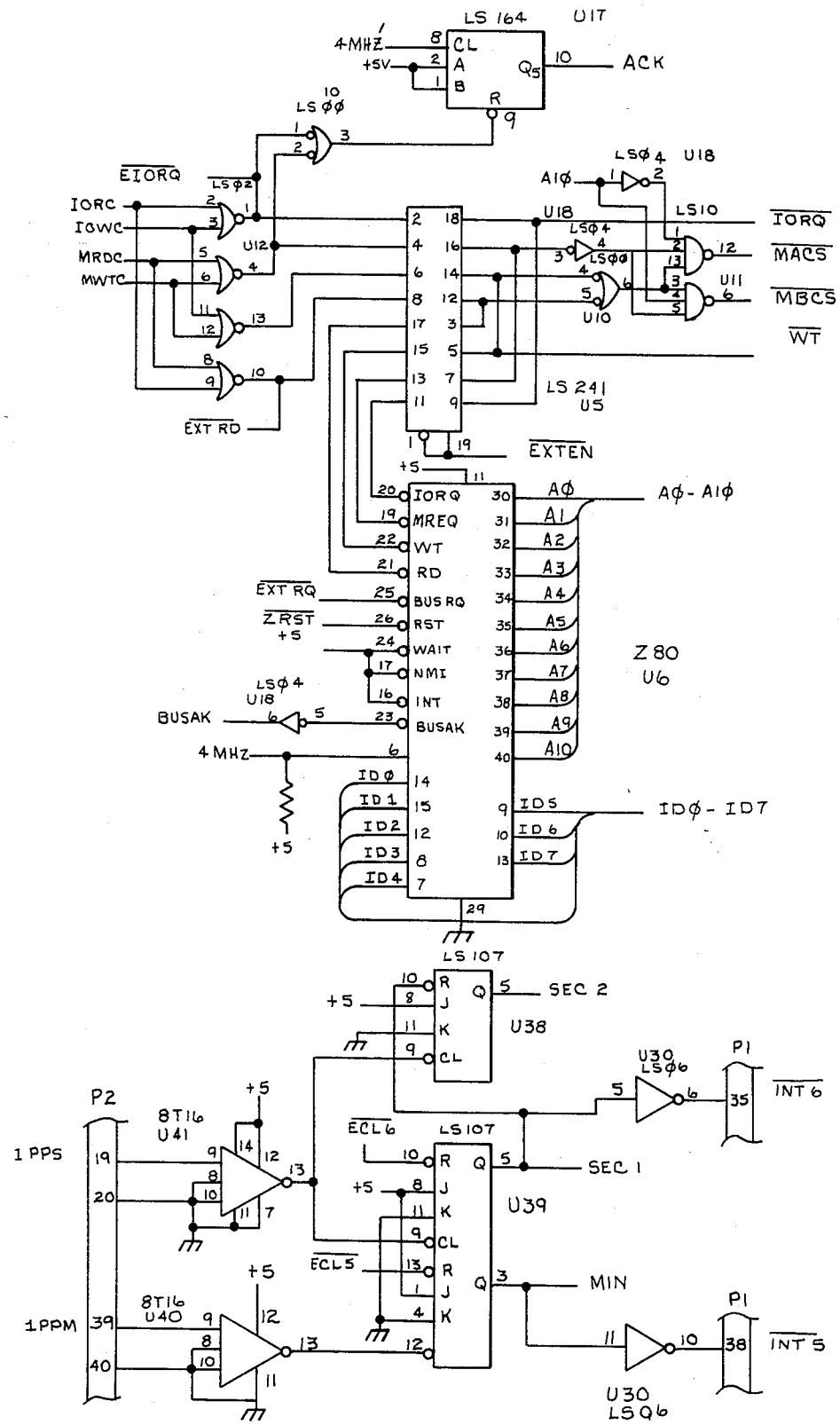
Figure 11:
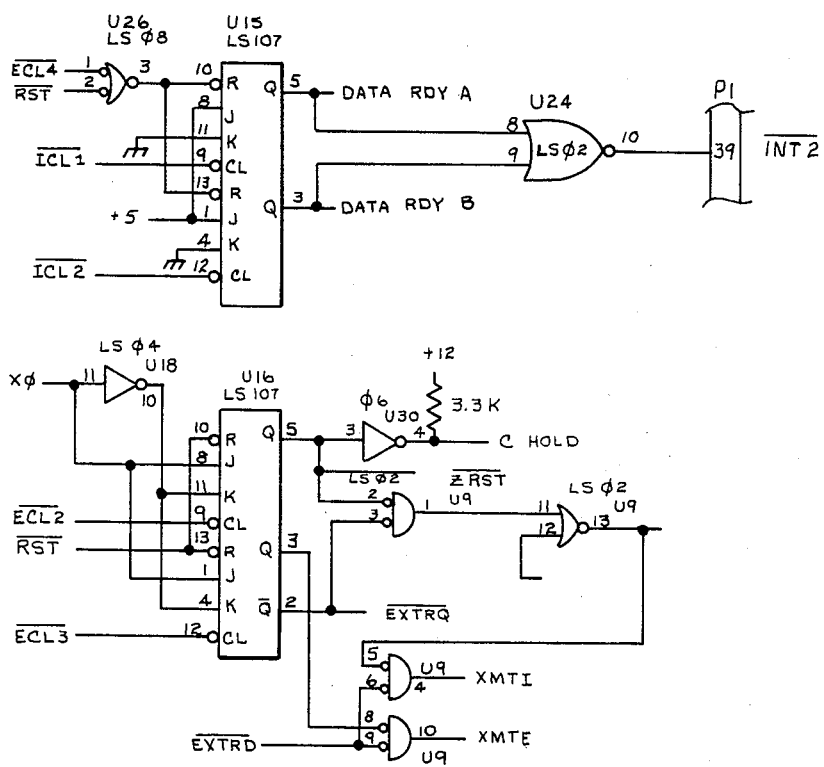

The preferred embodiment of the invention providing for the transmit output capability is shown in the block diagram of FIG. 3. The integrated circuit chips in the FIGS. 4–11 which make up the principal constituents of the block diagram are generally referred to in the blocks of FIG. 3. In this regard the static RAM 20, including an operating instruction portion and an A and B memory portion is made up of the integrated circuit assemblies U-1 through U-4 which are suitably coupled noting FIG. 8. The external enabling signals are fed to the bus switching circuits (see FIG. 7) by the integrated circuits generally designated as U-16 and U-9, see FIG. 11. The microprocessor 41 consists of the integrated circuit designated U-6 as shown in FIG. 10. The divider feeding the 4 mHz signal to the microprocessor is shown in detail as integrated circuit designated U-23 in FIG. 7.

The reset hold circuit, status register and mode register are written to or read from when appropriate address, control and data signals are received via the external bus from computer board 13. The appropriate data for establishing what mode of shift keying that the modulator 45 generates are written to the mode register 21 designated as U14 in FIG. 9. The status of the transmit simulator board is read from the status register 46 designated as U13 in FIG. 8. The reset hold circuit 47 has its principal component U-16 shown in FIG. 11. The physical embodiment of modulator 45 is set out in FIGS. 4, 5 and 6 and a thorough description of its operation is provided in Appendix A. The minute and second interrupts are effected through flip-flops 48 which are designated U-39 in FIG. 10 and function to give the interrupt 4 and 5 to the bus 15 in FIG. 3 for coupling back to interrupt controller 38 in FIG. 2. The one pulse per minute and one pulse per second clocks from frequency time standard 17 in FIG. 1 are received by line receivers designated as U40 and U41 in FIG. 10. The data to be recorded arrives at the universal shift register at a rate determined by the clock received from modulator 45. The universal shift register, designated as U-8 in FIG. 9, is responsive to address control and data signals output from microprocessor 41 following the setting of the byte ready flip-flop 43a designated as U73 in FIG. 9. The status of the A and B memory buffers is sent to the status register via the data ready flip-flops which are designated as U-15 in FIG. 11.

Obviously, many modifications and variations of the present invention are possible in the light of the above teachings. It is therefore to be understood that within the scope of the appended claims the invention may be practiced otherwise than as specifically described.

What is claimed is:

1. A digital transmit simulator for generating shift key modulated very low frequency signals for performance testing of at least one receiver comprising:

means in the form of at least one readily changeable floppy disk for storing digital data representative of a modulation sequence and modulation mode used to test the receiver;

means coupled to the digital data storing means for translating the stored digital data to compatible digital data modulation sequence signals and digital data modulation mode signals;

means for providing inputs from a frequency standard for synchronization purposes;

means coupled to the frequency standard providing means, the receiver and the translating means for generating shift keying modulated signals, the generating means including a modulator having a plurality of modulation modes coupled to the receiver, a mode register coupled to receive the translated digital data modulation mode signals from the translating means to create a selected actuation signal to initiate the modulator in a particular modulation mode and a data transition circuit coupled to the modulator to provide updated digital data to the translated data modulation sequence signals, the transition circuit including a static RAM having an operating instruction section responsive to operating instructions received from the translating means to provide actuating signals and an A memory and a B memory each responsive to information signals from the translating means to be alternately enabled to pass the information signals to the modulator and the data transition circuit also includes a universal shift register interposed between the static RAM and the modulator for feeding the information signals alternately from the A and B memories in a timed sequence according to a data clock rate signal coming from the modulator.

2. A digital transmit simulator according to claim 1 in which the data transition circuit further includes a byte ready flip-flop circuit coupled to a microprocessor to optionally enable the microprocessor to obtain a byte of information for transfer from the static RAM to the shift register to transfer the information signals appropriately in the playback mode or record mode, respectively.

3. A digital transmit simulator according to claim 2 in which the transition circuit further includes a data ready flip-flop circuit coupled to the microprocessor and to the translating means to provide an indication when data is ready to be alternately transferred from the A memory or B memory to the translating means in the record mode and vice versa in the playback mode.

4. A digital transmit simulator according to claim 3 in which the transition circuit further includes an external status register coupled to the modulator, the data ready flip-flop and the translating means via an external bus to provide an indication of the status of the transition circuit.

5. A digital transmit simulator according to claim 4 in which the transition circuit further includes a minute and second flip-flop circuit coupled to the frequency standard providing means the translating means and the external status register to assure a proper synchronized actuation thereof.

6. A digital transmit simulator according to claim 5 in which the transition circuit further includes a reset-and-hold circuit coupled to the data ready flip-flop, the modulator, the microprocessor and the minute and second flip-flop circuit to allow the transition circuit to be reset and started at an appropriate time.

* * * * *